(12) United States Patent
Zhang

(10) Patent No.: US 11,582,321 B2
(45) Date of Patent: Feb. 14, 2023

(54) SERVICE REQUEST PROCESSING METHOD AND RELATED APPARATUS

(71) Applicant: TENCENT TECHNOLOGY (SHENZHEN) COMPANY LIMITED, Guangdong (CN)

(72) Inventor: Zhuoyun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/484,417

(22) Filed: Sep. 24, 2021

(65) Prior Publication Data

US 2022/0014599 A1 Jan. 13, 2022

Related U.S. Application Data

(63) Continuation of application No. PCT/CN2020/100596, filed on Jul. 7, 2020.

(30) Foreign Application Priority Data

Aug. 1, 2019 (CN) .......................... 201910709171.4

(51) Int. Cl.
*H04L 67/562* (2022.01)
*H04L 67/51* (2022.01)
*H04L 67/60* (2022.01)

(52) U.S. Cl.
CPC ............ *H04L 67/562* (2022.05); *H04L 67/51* (2022.05); *H04L 67/60* (2022.05)

(58) Field of Classification Search
CPC ........ H04L 67/562; H04L 67/51; H04L 67/60
See application file for complete search history.

(56) References Cited

U.S. PATENT DOCUMENTS

2014/0173076 A1* 6/2014 Ravindran .......... H04L 12/6418
709/223
2020/0127916 A1* 4/2020 Krishan ................ H04L 47/125
(Continued)

FOREIGN PATENT DOCUMENTS

| CN | 101557572 A | 10/2009 |
| CN | 108401269 A | 8/2018 |
| CN | 109548137 A | 3/2019 |

(Continued)

OTHER PUBLICATIONS

ETSI "5G: System Architecture for the 5G System (3GPP TS 23.501 version 15.2.0. Release 15)", TS 123 501 V.15.2.0, https://www.etsi.org/deliver/etsi_ts/123500_123599/123501/15.02.00_60/ts_123501v150200p.pdf (Year: 2018).*

(Continued)

*Primary Examiner* — James E Springer
*Assistant Examiner* — Patrick F Ngankam
(74) *Attorney, Agent, or Firm* — Sughrue Mion, PLLC

(57) ABSTRACT

The disclosure provides a service request processing method. A service consumer transmits a service request, including a plurality of service producer types, and an access order of service producer instances corresponding to the plurality of service producer types is determined. The service producer instances corresponding to the plurality of service producer types are controlled to process the service request according to the access order.

16 Claims, 9 Drawing Sheets

(56) References Cited

U.S. PATENT DOCUMENTS

| | | | | |
|---|---|---|---|---|
| 2020/0336554 A1* | 10/2020 | Deshpande | ............. | H04L 67/51 |
| 2021/0127265 A1* | 4/2021 | Chandramouli | ........ | H04L 67/51 |

FOREIGN PATENT DOCUMENTS

| | | |
|---|---|---|
| CN | 109673005 A | 4/2019 |
| CN | 110365796 A | 10/2019 |
| JP | 2018-518927 A | 7/2018 |
| WO | 2018/223974 A1 | 12/2018 |
| WO | 2018/232570 A1 | 12/2018 |

OTHER PUBLICATIONS

Ericsson, "3GPP TSG-SA WG2 Meeting #133 S2-1905350", PCF selection for multiple PDU Sessions to the same DNN and S-NSSAI, May 17, 2019 (May 17, 2019), parts 6.3.2, 6.3.7.1.

3GPP TSG SSA, "3GPP TR 23.742 V0.3.0", Study on Enhancements to the Service-Based Architecture (Release 16), Jul. 31, 2018 (Jul. 31, 2018), entire document.

International Search Report for PCT/CN2020/100596 dated Oct. 12, 2020.

Written Opinion for PCT/CN2020/100596 dated Oct. 12, 2020.

Office Action dated Oct. 25, 2022 issued in Japanese Application No. 2021-554633.

"SCP Function Update", Tencent. Nokia, Huawei. HiSilicon, 3GPP TSG-SA WG2 Meeting #133, S2-1906645, May 13-17, 2019, Reno, US (8 pages total).

Office Action dated Nov. 16, 2022 in Korean Application No. 10-2021-7031363.

"eSBA communication schema co-existence", Nokia, Nokia Shanghai Bell, Huawei, HiSilicon, Ericsson, 3GPP TSG-SA WG2 Meeting #130, S2-1902726, Jan. 21-25, 2019, Kochi, India (2 pages total).

3GPP TS 23.501, "3rd Generation Partnership Project; Technical Specification Group Services and System Aspects; System Architecture for the 5G System; Stage 2 (Release 16)", vol. 16.1.0, Jun. 2019, pp. 2-367 (367 pages total).

3GPP TR 23.799, "3rd Generation Partnership Project; Technical Specification Group Services and System Aspects; Study on Architecture for Next Generation System (Release 14)", vol. 14.0.0, Dec. 2016, pp. 2-522 (522 pages total).

3GPP TR 23.742, "3rd Generation Partnership Project; Technical Specification Group Services and System Aspects; Study on Enhancements to the Service-Based Architecture (Release 16)", vol. 3.0, Jul. 2018, pp. 2-64 (65 pages total).

\* cited by examiner

SERVICE REQUEST PROCESSING METHOD AND RELATED APPARATUS

CROSS-REFERENCE TO RELATED APPLICATION(S)

This application is a continuation application of International Application No. PCT/CN2020/100596, filed Jul. 7, 2020, which claims priority to Chinese Patent Application No. 201910709171.4, filed with the China National Intellectual Property Administration on Aug. 1, 2019, the disclosures of which are incorporated by reference in their entireties.

FIELD

The disclosure relates to the field of communication technologies, and specifically, to service request processing.

BACKGROUND

At present, in the enhancements for Service Based Architecture (eSBA) subject of a Third Generation Partnership Project (3GPP) R16, the concept of a service communication proxy (SCP) is proposed. Communication messages between services are forwarded through an SCP. In addition, the SCP may perform proxy discovery. The SCP transmits a service discovery request to a network repository function (NRF) to discover a service producer list and select a service producer from the list.

SUMMARY

One or more example embodiments of the disclosure provide a service request processing method and a related apparatus, so that a simultaneous discovery mechanism for service producer instances corresponding to a plurality of service producer types may be implemented, thereby improving the efficiency of service processing.

According to an aspect of embodiments of the disclosure, a service request processing method is provided, performed by a service proxy device, the method including:

receiving a service request transmitted by a service consumer, the service request including a plurality of service producer types;

obtaining service producer instances respectively corresponding to the plurality of service producer types according to the service request;

determining an access order of the service producer instances corresponding to the plurality of service producer types; and controlling the service producer instances corresponding to the plurality of service producer types to process the service request according to the access order.

According to another aspect of the embodiments of the disclosure, a service request processing method is provided, performed by service producer instances, the method including:

receiving a service request, the service request including information about to-be-accessed service producer instances and an access order of the to-be-accessed service producer instances;

processing the service request; and transmitting, after the service request is processed, a new service request as a service consumer to a service proxy device, so that the service proxy device transmits the new service request to a next service producer instance according to the access order; or transmitting, after the service request is processed, a new service request as a service consumer to a next service producer instance in the access order, so that the next service producer processes the new service request.

According to another aspect of the embodiments of the disclosure, a service request processing apparatus is provided, including at least one memory configured to store program code; and at least one processor configured to read the program code and operate as instructed by the program code, the program code including:

receiving code configured to cause the at least one processor to receive a service request transmitted by a service consumer, the service request including a plurality of service producer types;

obtaining code configured to cause the at least one processor to obtain service producer instances respectively corresponding to the plurality of service producer types according to the service request;

determining code configured to cause the at least one processor to determine an access order of the service producer instances corresponding to the plurality of service producer types; and control code configured to cause the at least one processor to control the service producer instances corresponding to the plurality of service producer types to process the service request according to the access order.

According to another aspect of the embodiments of the disclosure, a service request processing apparatus is provided, including at least one memory configured to store program code; and at least one processor configured to read the program code and operate as instructed by the program code, the program code including:

receiving code configured to cause the at least one processor to receive a service request, the service request including information about to-be-accessed service producer instances and an access order of the to-be-accessed service producer instances;

response code configured to cause the at least one processor to respond to the service request; and transmission code configured to cause the at least one processor to: transmit, after the service request is responded to, a new service request as a service consumer to a service proxy device, so that the service proxy device transmits the new service request to a next service producer instance according to the access order; or transmit, after the service request is responded to, a new service request as a service consumer to a next service producer instance in the access order, so that the next service producer processes the new service request.

According to another aspect of the embodiments of the disclosure, a server is provided, including:

a processor, a communication interface, a memory, and a communication bus, the processor, the communication interface, and the memory communicating with each other by using the communication bus; the communication interface being an interface of a communication module;

the memory being configured to store program code and transmit the program code to the processor; and the processor being configured to call instructions of the program code in the memory to perform the method in the foregoing aspects.

According to another aspect of the embodiments of the disclosure, a storage medium is provided, configured to store a computer program, the computer program being configured to perform the method in the foregoing aspects.

According to another aspect of the embodiments of the disclosure, a computer program product including instructions is provided, the computer program product, when run on a computer, causing the computer to perform the method in the foregoing aspects.

BRIEF DESCRIPTION OF THE DRAWINGS

Accompanying drawings herein are incorporated into a specification and constitute a part of this specification, show example embodiments that conform to the disclosure, and are used for describing a principle of the disclosure together with this specification. The accompanying drawings in the following descriptions are merely some example embodiments of the disclosure, and a person of ordinary skill in the art may further obtain other accompanying drawings according to the accompanying drawings without creative efforts. In the accompanying drawings.

DETAILED DESCRIPTION

Example embodiments are now described more comprehensively with reference to the accompanying drawings. However, the example embodiments may be implemented in various forms, and it is not to be understood as being limited to the examples described herein. On the contrary, the example implementations are provided to make the descriptions of the disclosure more comprehensive and complete, and comprehensively convey the idea of the example implementations to a person skilled in the art. The accompanying drawings are merely example illustrations of the disclosure and are not necessarily drawn to scale. The same reference numbers in the accompanying drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the exemplary implementations of the disclosure. However, a person skilled in the art is to be aware that, the technical solutions in the disclosure may be implemented without one or more of the particular details, or another method, unit, or step may be used. In other cases, well-known structures, methods, implementations, or operations are not shown or described in detail, to avoid obscuring the aspects of the disclosure.

Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

A system architecture to which a service request processing method of the embodiments of the disclosure is applied is described below with reference to FIG. 1.

Figure 1:
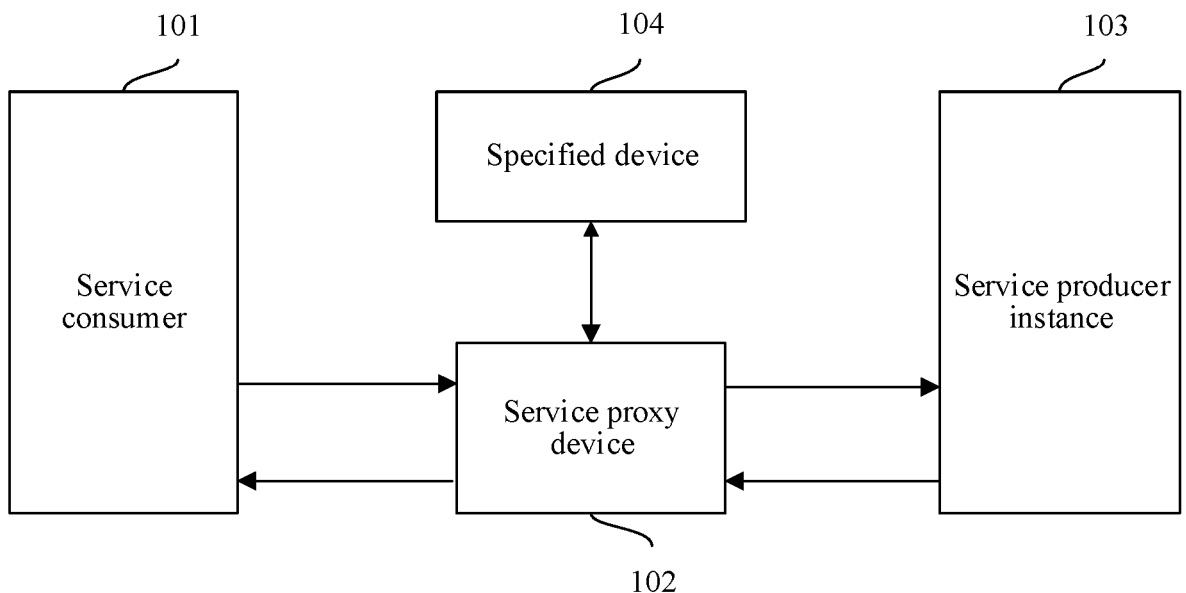
FIG. 1 is a diagram of a system architecture to which a service request processing method is applied according to an example embodiment of the disclosure.

As shown in FIG. 1, the system architecture to which the disclosure is applied may include a service consumer 101, a service proxy device 102, a service producer instance 103, and a specified device 104. The service consumer 101 is a device that transmits a service request, and may be a server, or may be a user terminal such as a smartphone, a tablet computer, a portable computer, or a desktop computer. The service proxy device 102 is a device that receives a service request, such as a service communication proxy (SCP). The service proxy device 102 may forward the service request to the service producer instance 103, and the service producer instance 103 is configured to respond to the service request and return a response result to the service consumer 101.

The service consumer 101 does not directly perform service discovery and selection. When transmitting a service request, the service consumer 101 transmits a related parameter to the service proxy device 102. The service proxy device 102 has both functions of message forwarding and proxy service discovery in indirect communication, and is an execution body of the service request processing method in this embodiment of the disclosure. The service proxy device 102 is inserted between the service consumer 101 and the service producer instance 103, and plays a role of transmitting a service discovery request to the specified device 104 for service discovery and forwarding a service request to the service producer instance for service response. Certainly, after the service producer instance 103 processes the service request, the service proxy device 102 also needs to receive the response result transmitted by the service producer instance 103 and return the response result to the service consumer 101.

The specified device 104 is communicatively connected to the service proxy device 102, and the service proxy device 102 transmits a service discovery request message to the specified device 104 to obtain a result of the service discovery.

It is to be understood that quantities of the service consumer 101, the service proxy device 102, the service producer instance 103, and the specified device 104 in FIG. 1 are merely illustrative. There may be any quantities of service consumers 101, service proxy devices 102, service producer instances 103, and specified devices 104 depending on embodiments.

According to an embodiment of the disclosure, a service request processing method is provided.

Figure 2:
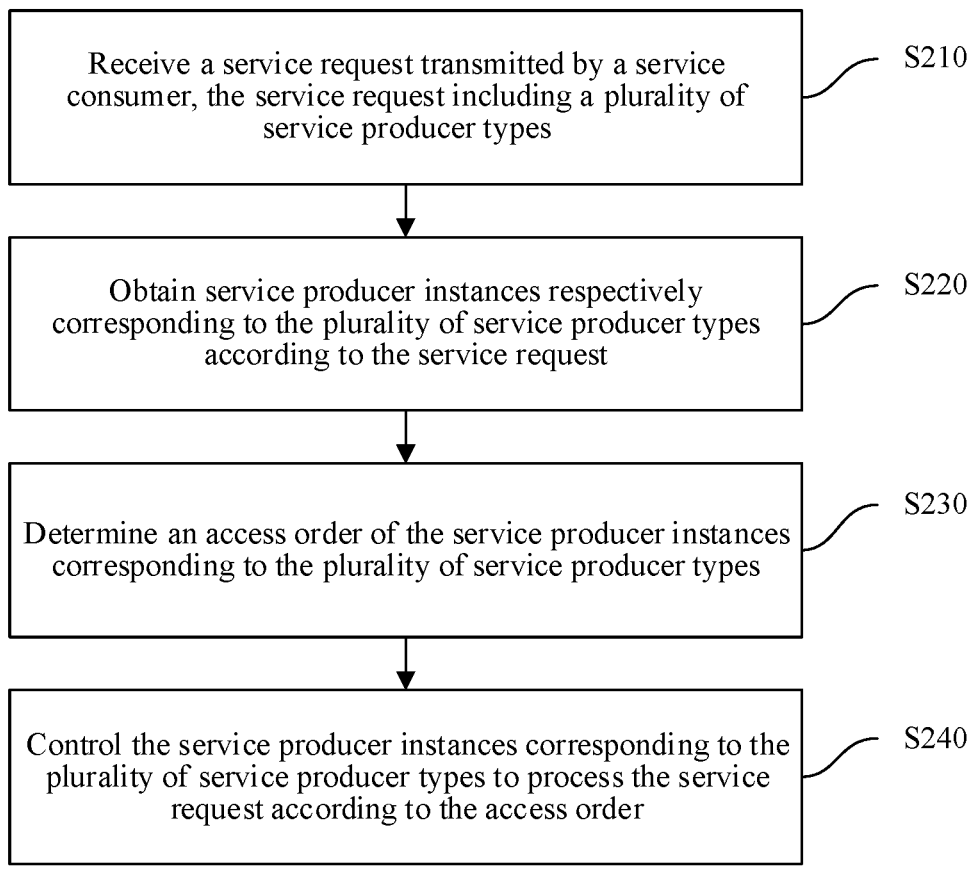
FIG. 2 is a flowchart of a service request processing method according to an example embodiment of the disclosure.

FIG. 2 is a flowchart of a service request processing method according to an example embodiment of the disclosure. As shown in FIG. 2, the method according to an example embodiment includes the following operations:

S210: Receive a service request transmitted by a service consumer, the service request including a plurality of service producer types.

S220: Obtain service producer instances respectively corresponding to the plurality of service producer types according to the service request.

S230: Determine an access order of the service producer instances corresponding to the plurality of service producer types.

S240: Control the service producer instances corresponding to the plurality of service producer types to process the service request according to the access order.

The operations are described below in detail.

S210: Receive a service request transmitted by a service consumer, the service request including a plurality of service producer types.

The service request transmitted by the service consumer may include attribute information, and the attribute information may correspond to a preset attribute. When the service request includes the attribute information, a type of the service request may be determined according to the attribute information in the service request. That is, service types of the service producers included in the service request are determined. In the disclosure, the service types may be expressed as the service producer types.

In S220, the obtaining the service producer instances corresponding to the service producer types may be directly obtaining the plurality of service producer instances corresponding to the service producer types, or obtaining service producer instance lists corresponding to the service producer types included in the service request. For each service producer type, a service producer instance list is found and returned. The service producer instance list includes a service producer instance of a service type that meets a parameter condition in the service request.

A manner of obtaining the service producer instances may include transmitting a service discovery request to a specified device, or obtaining the service producer instances directly from a historical service discovery result, which is not limited herein.

The service producer instances corresponding to the service types and obtained according to the service request are not only consistent with names of the service producer types, but also are service producer instances that meet parameter information in the service request.

Figure 3:
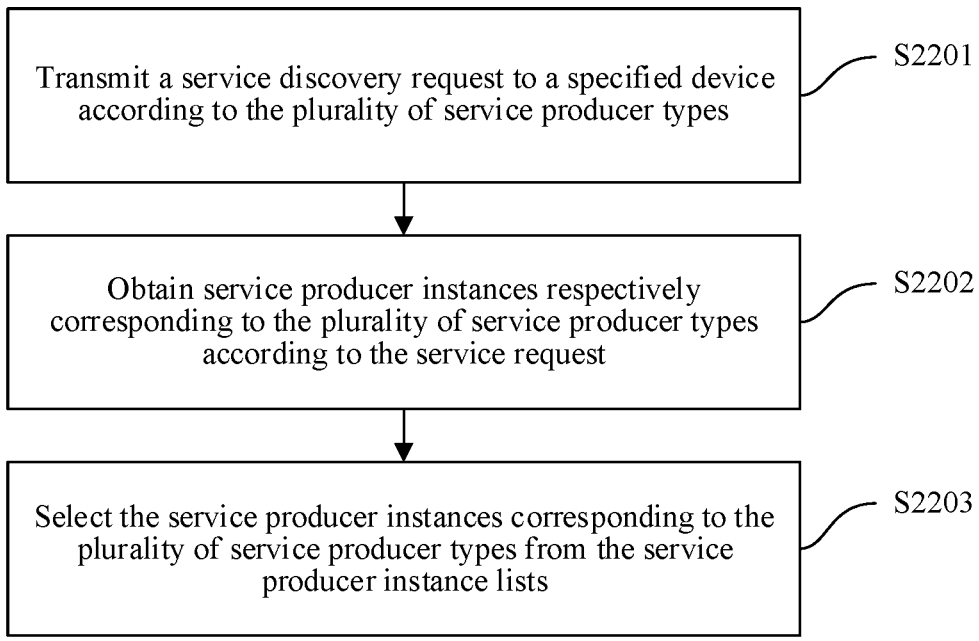
FIG. 3 is a flowchart of obtaining service producer instances according to an example embodiment of the disclosure.

FIG. 3 is a flowchart of obtaining service producer instances according to an example embodiment of the disclosure. In an example embodiment, as shown in FIG. 3, S220 specifically includes the following operations:

S2201: Transmit a service discovery request to a specified device according to the plurality of service producer types.

S2202: Receive service producer instance lists returned by the specified device according to the service discovery request.

S2203: Select the service producer instances corresponding to the plurality of service producer types from the service producer instance lists.

In S2201, the specified device may discover service producer instance lists that meet all service producer types according to the service producer types and a selection parameter in the received service discovery request.

In S2202, after generating the service producer instance lists, the specified device returns a service discovery result to a service proxy device, that is, the service producer instance lists corresponding to the service producer types, each service producer type corresponding to one service producer instance list.

In S2203, after the service producer instance lists are obtained from the specified device, service producer instances corresponding to a service producer type may be selected randomly or in another selection manner (e.g., using a preset rule) from the service producer instance list corresponding to each service producer type.

In an example embodiment, after the service request is received and before the service discovery request is transmitted to the specified device, that is, before S2201, the service proxy device may detect whether the corresponding service producer instances are stored in a historical service discovery result. In one aspect, the obtaining the service producer instances from the historical service discovery result may avoid re-executing the service discovery request and wasting computing resources. In another aspect, the service producer instances are directly obtained from the historical service discovery result, so that the time of service request processing may be further reduced.

Figure 4:
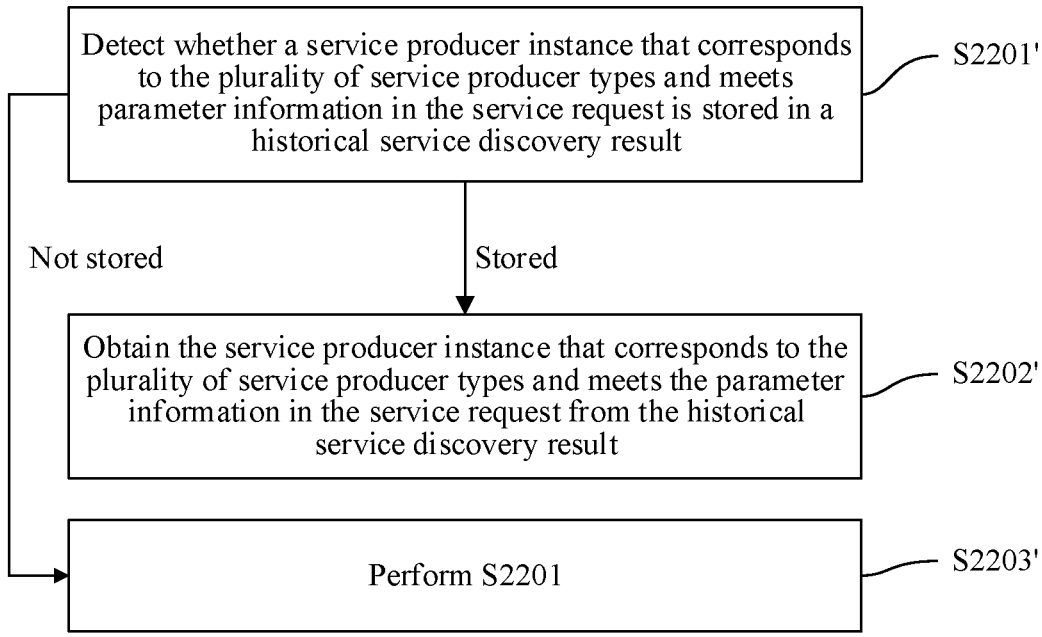
FIG. 4 is a flowchart of obtaining service producer instances according to another example embodiment of the disclosure.

FIG. 4 is a flowchart of obtaining service producer instances according to another example embodiment of the disclosure. In an example embodiment, as shown in FIG. 4, S220 includes the following operations:

S2201': Detect whether a service producer instance that corresponds to the plurality of service producer types and meets parameter information in the service request is stored in a historical service discovery result.

When the service producer instance is stored, S2202' is performed; and when the service producer instance is not stored, S2203' is performed.

S2202': Obtain the service producer instance that corresponds to the plurality of service producer types and meets the parameter information in the service request from the historical service discovery result.

S2203': Perform S2201 in FIG. 3.

In S2201', the historical service discovery result is information obtained by transmitting the service discovery request to the specified device during service access before the current service request. The information is stored in the service proxy device. When a selection parameter of a service producer included in a subsequent service request is consistent with a previous discovery result, the previously saved service discovery result is used directly without the need to perform service discovery on the specified device, thereby saving computing resources.

In an example embodiment, a valid time is set for the historical service discovery result, and when the service producer instance that corresponds to the plurality of service producer types and meets the parameter information in the service request is stored in the historical service discovery result, the method further includes:

determining whether the historical service discovery result exceeds the valid time;

performing S2201 when the historical service discovery result exceeds the valid time; and performing S2202' when the historical service discovery result does not exceed the valid time.

In an example embodiment, a valid time is set for the historical service discovery result, indicating that the historical service discovery result is only valid within the set time. If the historical service discovery result exceeds the time, the historical service discovery result is invalid. If the historical service discovery result stores a service producer instance that corresponds to the plurality of service producer types and meets the parameter information in the service request, it needs to be further determined whether the historical service discovery result exceeds the valid time. If the historical service discovery result exceeds the valid time, the historical service discovery result is not valid, the service proxy device still needs to transmit the service discovery request to the specified device according to the service producer types included in the service request and the parameter information included in the service request, and the service proxy device deletes invalid service discovery results.

In this embodiment, the valid time is set and invalid service discovery results are deleted, so that in one aspect, the accuracy of historical service discovery data may be ensured, and in another aspect, old data may be prevented from occupying memory space and storage space may be saved, thereby improving a speed of access to the historical service discovery data.

Before requesting service discovery from the specified device, it is detected whether a service producer instance that corresponds to the service producer types and meets parameter information in the service request is included in a historical service discovery result. The service producer instance that corresponds to the service producer types is directly obtained from the historical service discovery result that meets the selection parameter according to the service producer types in the service request, so that the query time is short and the access speed is fast.

In S230, an access order of the service producer instances corresponding to the plurality of service producer types is determined.

When a plurality of service producer instances are to be accessed, a service producer instance of a service producer type is selected from a service producer instance list corresponding to each service producer type. The instances corresponding to the service producer types are accessed for a service request according to a specified access order.

In an example embodiment, S230 specifically includes the following operations:

determining an arrangement order of the plurality of service producer types according to order indication information in the service request; and using the arrangement order of the plurality of service producer types as the access order of the service producer instances corresponding to the plurality of service producer types.

In this embodiment, the service request transmitted by the service consumer includes order indication information. The order indication information is used to indicate the arrangement order of the service producer types in the service request, that is, the access order of the service producer instances corresponding to the service producer types. The access order includes at least a serial order, and the serial order is used to indicate that the service producer instances are accessed in a serial order.

In an example embodiment, the access order may further include a parallel order. The parallel order is used to indicate that the service producer instances are accessed simultaneously, and there is no requirement for a sequential order. When the access order is a parallel order, the service proxy device simultaneously forwards the service request to a plurality of service producer instances in the parallel order for processing. After completing the processing, the plurality of service producer instances return service response messages to the service consumer.

The embodiments in the disclosure are mainly aimed at controlling the processing of the service request by the service producer instances in the serial order.

For example, if a service request transmitted by the service consumer includes three service producer types A, B, and C, an arrangement order of the three service producer types is determined according to order indication information included in the service request as A, B, and C. That is, A is the first service producer type, B is the second service producer type, and C is the third service producer type.

After the arrangement order of the service producer types are determined, the arrangement order may be directly used as an access order of corresponding service producer instances. If the service producer instances corresponding to the three service producer types A, B, and C included in the service request transmitted by the service consumer are respectively a, b, and c, the access order of the three service producer instances a, b, and c is a, b, and c. That is, a is the first service producer instance to be accessed, b is the second service producer instance to be accessed, and c is the third service producer instance to be accessed.

According to the access order, after the second last service producer instance processes the service request, the service request is transmitted to the last service producer instance for processing. Because there is only one service producer instance in the service request, the access order does not need to be included in the service request.

In S240, the service producer instances corresponding to the plurality of service producer types are controlled to process the service request according to the access order.

In S240, after the access order of the service producer instances is determined, the service producer instances may be accessed sequentially according to the access order to process the service request.

In an example embodiment, S240 specifically includes the following operation:

transmitting the service request to a first-in-order service producer instance in the access order, and when a new service request is received from a target service producer instance, as a service consumer, after the service request is processed, transmitting the new service request to a first-in-order service producer instance in a subsequent access order. The target service producer instance is one of the service producer instances corresponding to the plurality of service producer types.

In this embodiment, after processing the service request, any service producer instance transmits a new service request as a service consumer to the service proxy device. After receiving the new service request, the service proxy device forwards the new service request to the first-in-order service producer instance in the subsequent access order.

The subsequent access order is an access order of service producer instances that do not receive the service request. It is clear that the service producer instances in the subsequent access order do not include service producer instances that have processed the service request. The first-in-order service producer instance in the subsequent access order is a service producer instance being the first instance in the subsequent access order.

For example, a service request transmitted by the service consumer includes three service producer types A, B, and C, service producer instances corresponding to the three service producer types A, B, and C are respectively a, b, and c, and an access order is a, b, and c. The service proxy device transmits the service request to a first service producer instance a, which is a first-in-order service producer instance in the access order of a, b, and c. After the first service producer instance a processes the service request, the first service producer instance a transmits a new service request as a service consumer to the service proxy device. After receiving the new service request transmitted by the first service producer instance a as a service consumer, the service proxy device forwards the new service request to a first-in-order service producer instance in the subsequent access order of b and c, that is, the second service producer instance b. The second service producer instance b is used to process the new service request transmitted by the first service producer instance a as a service consumer. After the second service producer instance b processes the service request, the second service producer instance b transmits a new service request as a service consumer to the service proxy device. After receiving the new service request transmitted by the second service producer instance b as a service consumer, the service proxy device forwards the new service request to the third service producer instance c. The third service producer instance c is used to process the new service request transmitted by the second service producer instance b as a service consumer. When processing the service request, the last service producer instance c in the access order returns a service response message to the second service producer instance b, the second service producer instance b transmits a service response message to the first service producer instance a, and the first service producer instance a transmits a service response message to the service consumer.

In an example embodiment, the new service request transmitted by the target service producer instance as the service consumer after the service request is processed includes: information about a service producer instance following the target service producer instance in the access order and the subsequent access order.

The new service request forwarded to the first-in-order service producer instance in the subsequent access order includes: information about a service producer instance following the first-in-order service producer instance in the subsequent access order and the subsequent access order.

In this embodiment, the new service request transmitted by the target service producer instance as the service consumer after the service request is processed includes: information about a service producer instance following the target service producer instance in the access order and the subsequent access order, the subsequent access order being an access order of service producer instances following the target service producer instance.

The new service request forwarded to the first-in-order service producer instance in the subsequent access order includes: information about a service producer instance following the first-in-order service producer instance in the subsequent access order and a further subsequent access order. For example, the service request transmitted by the service proxy device to the first service producer instance a includes information about the second service producer instance b and the third service producer instance c, and the access order of the second service producer instance b and the service producer instance c. After processing the service request, the first service producer instance a transmits a new service request as a service consumer to the service proxy device. The new service request includes the information about the second service producer instance b and the third service producer instance c, and the access order of the second service producer instance b and the service producer instance c. After processing the new service request, the second service producer instance b transmits another new service request as a service consumer to the service proxy device. The another new service request includes information about the third service producer instance c. Because there is only one service producer instance c in the service request, there is no order for one service producer instance, so that the service request does not need to include the subsequent access order.

The new service request transmitted by the first service producer instance a as a service consumer and received by the service proxy device includes the information about the second service producer instance b and the third service producer instance c, and the access order of the second service producer instance b and the third service producer instance c. The new service request transmitted by the second service producer instance b as a service consumer and received by the service proxy device includes the information about the third service producer instance c. Because there is only one service producer instance c in the service request, there is no order for one service producer instance, so that the service request does not need to include the subsequent access order.

In an example embodiment, S240 specifically includes the following operation:

transmitting the service request and the access order to the first-in-order service producer instance in the access order any service producer instance in the access order transmitting, after processing the service request, a new service request as a service consumer to a next service producer instance for processing, and sequentially returning service response messages until all service producer instances in the access order have been processed.

In this embodiment, when the service producer instances may communicate directly with each other, any service producer instance, after responding to the service request, may directly transmit the service request as a service consumer to the next service producer instance for processing according to the access order, and sequentially return service response messages until all service producer instances in the access order have been processed.

For example, a service request transmitted by the service consumer includes three service producer types A, B, and C, service producer instances corresponding to the three service producer types A, B, and C are respectively a, b, and c, and an access order is a, b, and c. The service proxy device transmits the service request to the first service producer instance a. After the first service producer instance a processes the service request, the first service producer instance a transmits a new service request as a service consumer to the second service producer instance b. The second service producer instance b is used to process the new service request transmitted by the first service producer instance a as a service consumer. After the second service producer instance b processes the service request, the second service producer instance b transmits a new service request as a service consumer to the third service producer instance c. When processing the service request, the last service producer instance c in the access order returns a service response message to the second service producer instance b, the second service producer instance b transmits a service response message to the first service producer instance a, and the first service producer instance a transmits a service response message to the service consumer.

The advantage of this embodiment is that the service request may be forwarded directly between the service producer instances, without the need of connection and communication between service proxy devices, so that the service request forwarding time is reduced and service request processing efficiency is improved.

According to an embodiment of this disclosure, a service request processing method is provided. The method is performed by any service producer instance 103.

Figure 5:
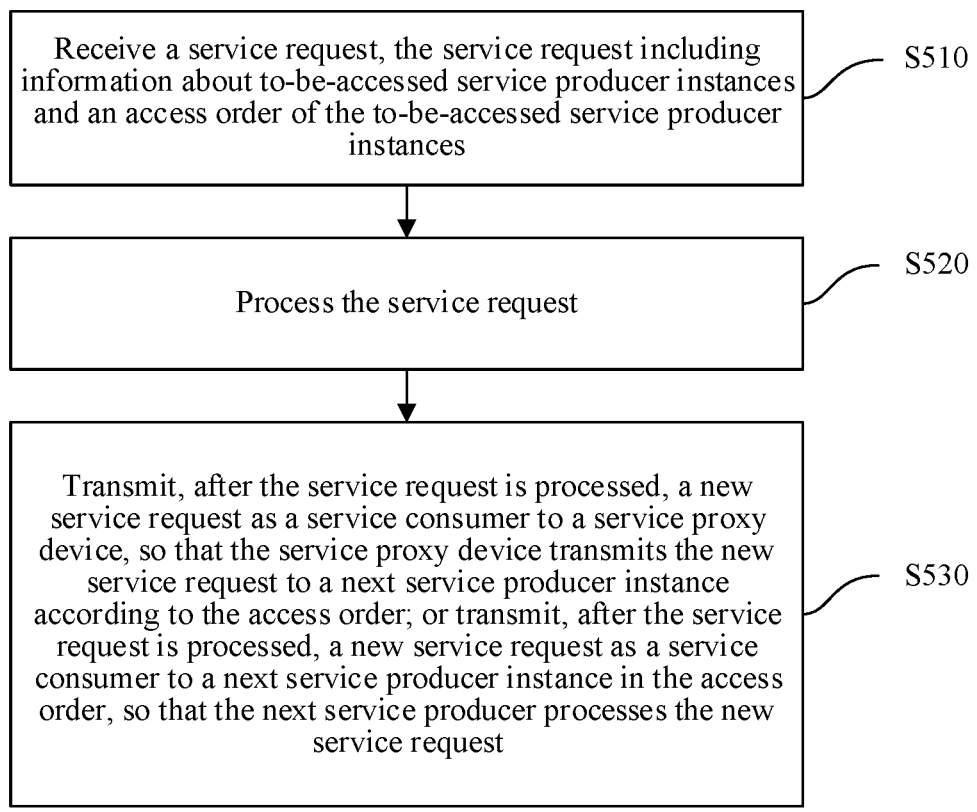
FIG. 5 is a flowchart of a service request processing method according to an example embodiment of the disclosure.

FIG. 5 is a flowchart of a service request processing method according to an example embodiment of the disclosure. As shown in FIG. 5, the method includes the following operations:

S510: Receive a service request, the service request including information about service producer instances to be accessed (or referred to as to-be-accessed service producer instances) and an access order of the to-be-accessed service producer instances.

S520: Process the service request.

S530: Transmit, after the service request is processed, a new service request as a service consumer to a service proxy device, so that the service proxy device transmits the new service request to a next service producer instance according to the access order; or transmit, after the service request is processed, a new service request as a service consumer to a next service producer instance in the access order, so that the next service producer processes the new service request.

In S510, in addition to the plurality of service producer types, the service request further includes the information and the access order of the to-be-accessed service producer instances.

The to-be-accessed service producer instances are service producer instances that do not receive the service request. A service producer instance that has received the service request but has not started to process the service request cannot be considered as a to-be-accessed service producer instance.

In S530, two possible implementations may be included:

In the first implementation, after a current service producer instance processes the service request, the current service producer instance transmits a new service request as a service consumer to the service proxy device. The service request includes the information about the to-be-accessed service producer instances and the subsequent access order. The service proxy device may forward the new service request to the first-in-order service producer instance in the subsequent access order according to the information included in the received new service request.

In the second implementation, when the service producer instances may communicate directly with each other, after the current service producer instance processes the service request, the current service producer instance transmits a new service request as a service consumer to the next service producer instance.

Figure 6:
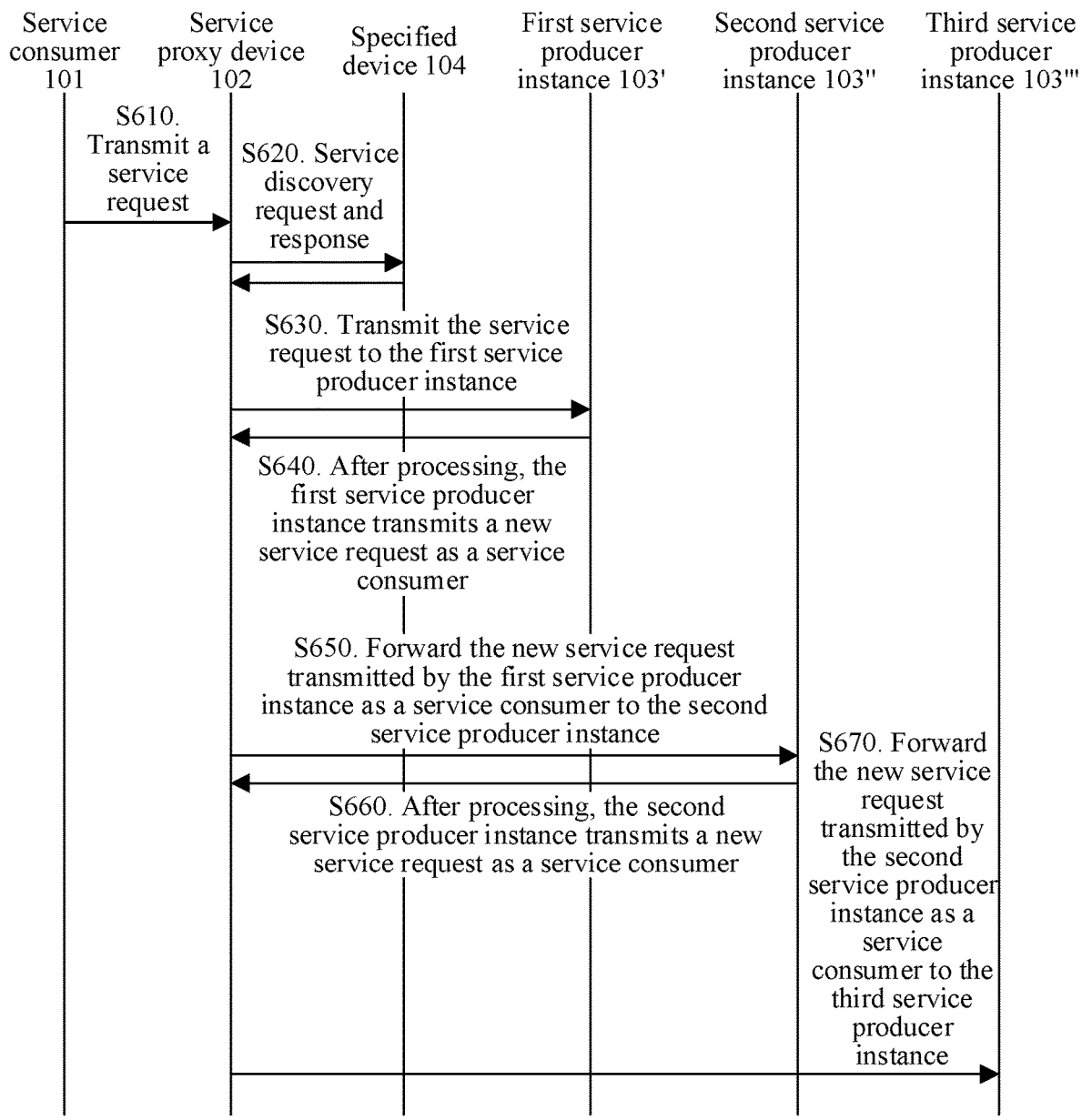
FIG. 6 is an interaction flowchart of a service request processing method according to an example embodiment of the disclosure.

FIG. 6 is an interaction flowchart of a service request processing method according to an embodiment of the disclosure.

The "first", "second", and "third" in the first service producer instance, the second service producer instance, and the third service producer instance in FIG. 6 only represent the access order of the service producer instances, and the quantity of the service producer instances is only illustrative. Depending on embodiments, there may be any quantity of service producer instances.

In S610, a service consumer 101 transmits a service request to a service proxy device 102. When the service request includes more than one service type, an order of service types is the same as a service access order. For example, the service request includes a service type of the first service producer instance 103', a service type of the second service producer instance 103", and a service type of the third service producer instance 103'''. In this way, the service request is first transmitted to the first service producer instance 103'. After the first service producer instance processes the service request, the service request is then transmitted to the second service producer instance 103" for processing. After the second service producer instance processes the service request, the service request is then transmitted to the third service producer instance 103 ''' for processing.

In S620, after receiving the service request, the service proxy device 102 transmits a service discovery request to a specified device 104, the service discovery request including a plurality of service types. The specified device 104 returns service producer instance lists that meet all the service types. The service proxy device 102 selects the first service producer instance 103', the second service producer instance 103", and the third service producer instance 103'''.

In S630, the service proxy device 102 first transmits the service request to the first service producer instance 103' according to an access order of the service producer instances. The service request includes information about the first service producer instance 103' selected by the service proxy device 102, and information about the second service producer instance 103" following the first service instance 103' in the access order, and the subsequent access order.

In S640, after the first service producer instance 103' processes the service request, the first service producer instance 103' transmits a new service request as a service consumer to the service proxy device 102. The new service request includes the information about the second service producer instance 103", the information about the third service producer instance 103''', and the access order of the second service producer instance 103" and the third service producer instance 103'''.

In S650, the service proxy device 102 forwards, according to a subsequent access order, the new service request transmitted by the first service producer instance 103' as a service consumer to the second service producer instance 103". The second service producer instance 103" is used to process the new service request transmitted by the first service producer instance 103' as a service consumer. The new service request includes the information about the third service producer instance 103'''

In S660, after the second service producer instance 103" processes the service request, the second service producer instance 103" transmits a new service request as a service consumer to the service proxy device 102. The new service request includes the information about the third service producer instance 103'''.

In S670, the service proxy device 102 forwards, according to the subsequent access order, the new service request transmitted by the second service producer instance 103" as a service consumer to the third service producer instance 103'''. The third service producer instance 103''' is used to process the new service request transmitted by the second service producer instance 103" as a service consumer.

Figure 7:
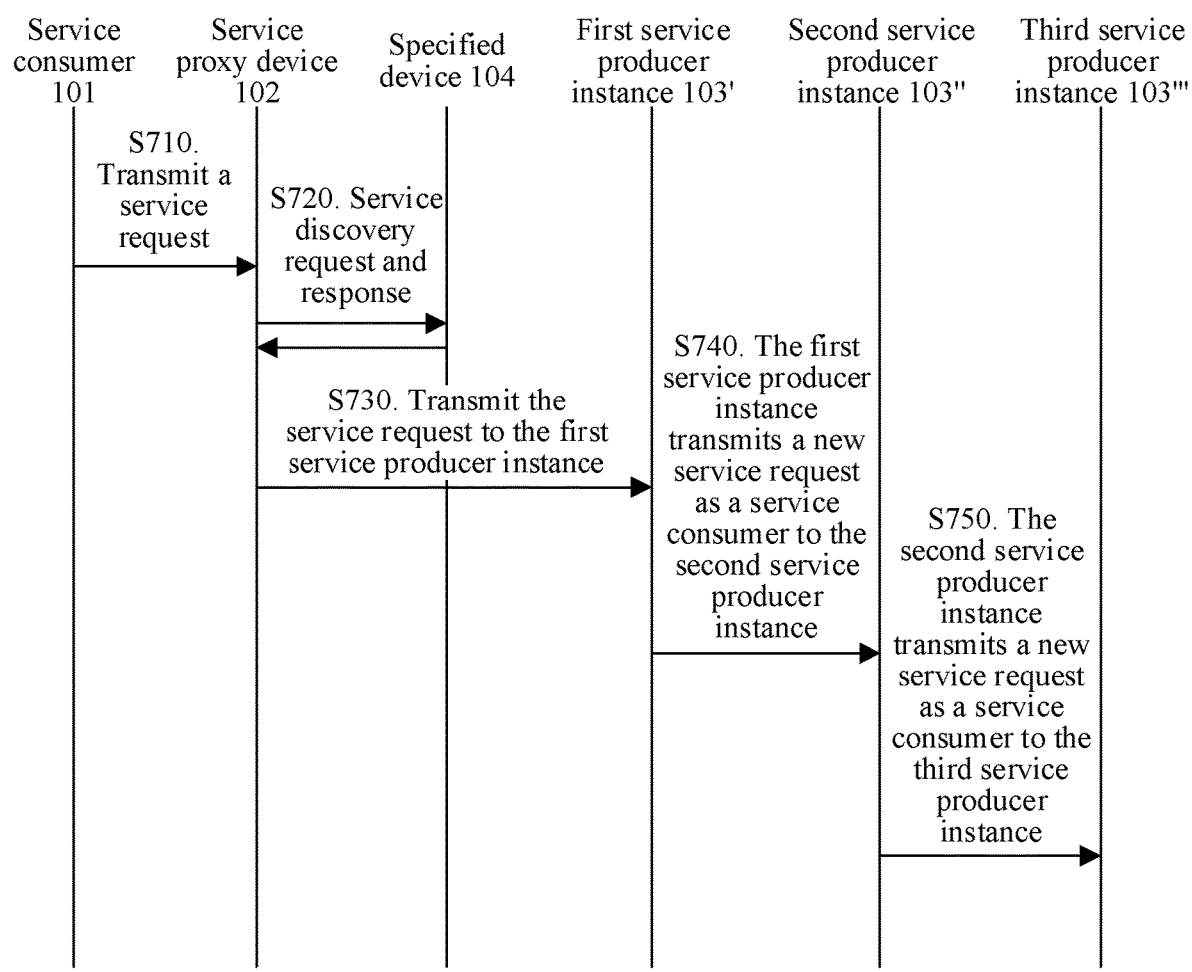
FIG. 7 is an interaction flowchart of a service request processing method according to another embodiment of the disclosure.

FIG. 7 is an interaction flowchart of a service request processing method according to another embodiment of the disclosure. In FIGS. 7, S710 to S730 are the same as S610 to S630 in FIG. 6, and the details are not repeated.

In S740, the first service producer instance 103' may directly communicate with the second service producer instance 103'''. Therefore, after processing the service request, the first service producer instance 103' directly transmits a new service request as a service consumer to the second service producer instance 103''.

In S750, the second service producer instance 103'' may directly communicate with the third service producer instance 103'''. Therefore, after processing the service request, the second service producer instance 103'' directly transmits a new service request as a service consumer to the third service producer instance 103'''.

Figure 8:
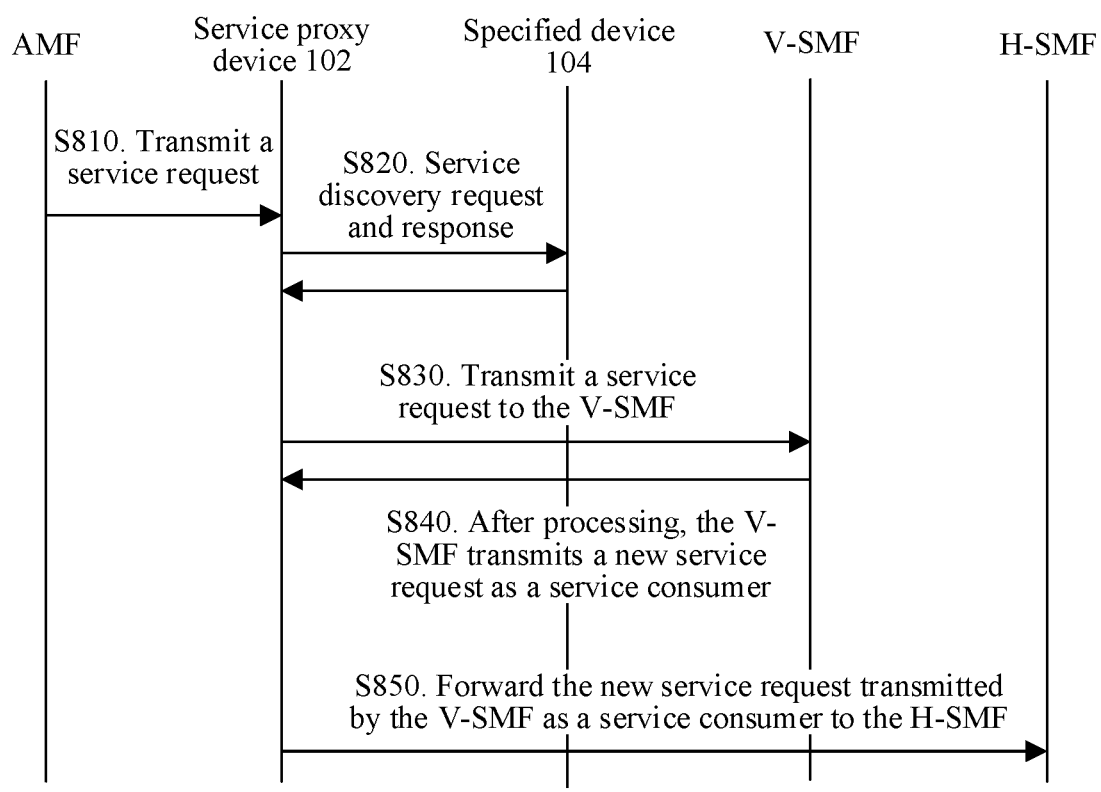
FIG. 8 is an interaction flowchart of applying a service request processing method to an application scenario of a session management function (SMF) according to an example embodiment of the disclosure.

FIG. 8 is an interaction flowchart of applying a service request processing method to an application scenario of a session management function (SMF) according to an embodiment of the disclosure.

In the 5G core network, network elements of different types in a control plane may be considered as different types of network functions (NF). Each NF may include several NF services. In the existing core network procedure, the call between NFs is embodied by the call of NF services. In an application scenario selected by an SMF in a home location roaming scenario of the 5G core network, the service consumer 101 is an access and mobility management function (AMF). In S810, an AMF transmits a service request to a service proxy device 102, the service request including service types of a V-SMF and an H-SMF and order indication information. In S820, the service proxy device 102 transmits a service discovery request to a specified device 104 according to the service request. The specified device 104 returns, in response to the service discovery request, service producer instance lists that meet all the service types to the service proxy device 102. The service proxy device 102 selects a V-SMF instance and an H-SMF instance, and transmits the service request according to an access order of the selected V-SMF instance and H-SMF instance. In S830, the service proxy device 102 first transmits the service request to the V-SMF instance according to the access order, the transmitted service request including information about the H-SMF instance. In S840, after processing, the V-SMF instance transmits a new service request as a service consumer to the service proxy device 102, the new service request including the information about the H-SMF instance. In S850, after the service proxy device 102 receives the new service request transmitted by the V-SMF instance as a service consumer, the service proxy device 102 transmits the new service request to the H-SMF instance.

Figure 9:
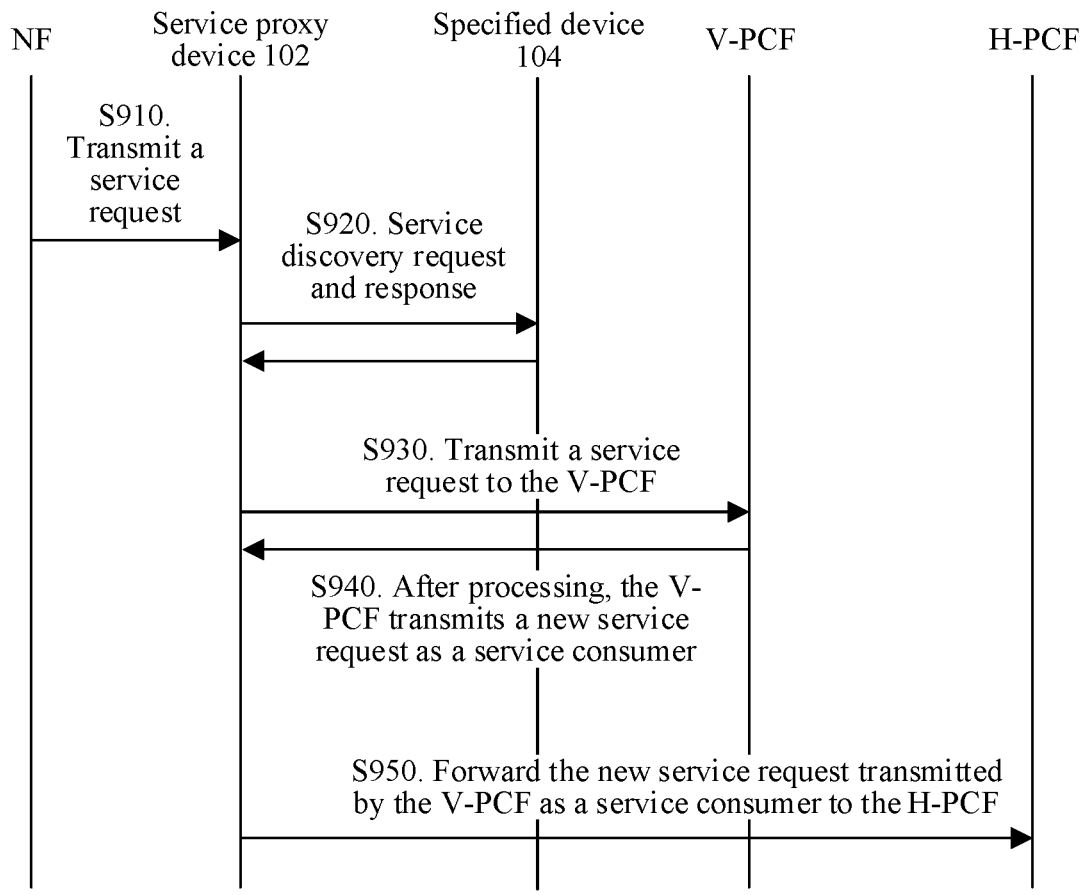
FIG. 9 is an interaction flowchart of applying a service request processing method to an application scenario of a policy control function (PCF) according to an example embodiment of the disclosure.

FIG. 9 is an interaction flowchart of applying a service request processing method to an application scenario of a policy control function (PCF) according to an embodiment of the disclosure.

In an application scenario selected by a PCF in the home location roaming scenario of the 5G core network, the service consumer 101 is the NF. If the NF needs to select both a roaming location V-PCF and a home location H-PCF, the V-PCF and the H-PCF are the service producer instances 103. In S910, the NF transmits a service request to the service proxy device 102, the service request including service types of the V-PCF and the H-PCF and order indication information. In S920, the service proxy device 102 transmits a service discovery request to a specified device 104 according to the service request. The specified device 104 returns, in response to the service discovery request, service producer instance lists that meet all the service types to the service proxy device 102. The service proxy device 102 selects a V-PCF instance and an H-PCF instance, and transmits the service request according to an access order of the selected V-PCF instance and H-PCF instance. In S930, the service proxy device 102 first transmits the service request to the V-PCF instance according to the access order, the transmitted service request including information about the H-PCF instance. In S940, after processing, the V-PCF instance transmits a new service request as a service consumer to the service proxy device 102, the new service request including the information about the H-PCF instance. In S950, after the service proxy device 102 receives the new service request transmitted by the V-PCF instance as a service consumer, the service proxy device 102 transmits the new service request to the H-PCF instance.

Figure 10:
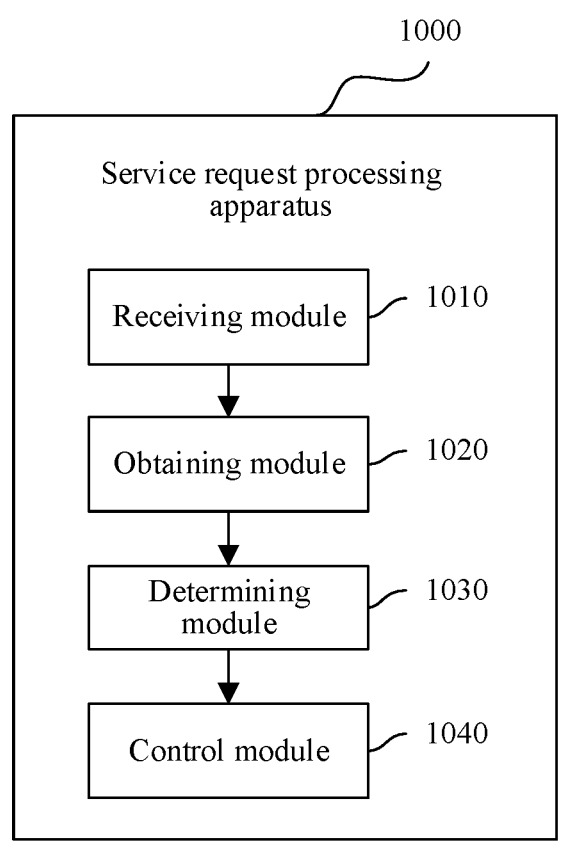
FIG. 10 is a block diagram of a service request processing apparatus according to an example embodiment of the disclosure.

FIG. 10 is a block diagram of a service request processing apparatus according to an example embodiment of the disclosure. As shown in FIG. 10, according to an embodiment of the disclosure, a service request processing apparatus is provided. For details not disclosed in the apparatus embodiments of the disclosure, refer to the foregoing embodiments of the service request processing method of the disclosure. The apparatus includes:

a receiving module 1010, configured to receive a service request transmitted by a service consumer, the service request including a plurality of service producer types;

an obtaining module 1020, configured to obtain service producer instances respectively corresponding to the plurality of service producer types according to the service request;

a determining module 1030, configured to determine an access order of the service producer instances corresponding to the plurality of service producer types; and a control module 1040, configured to control the service producer instances corresponding to the plurality of service producer types to process the service request according to the access order.

In an embodiment, the control module 1040 is configured to:

transmit the service request to a first-in-order service producer instance in the access order, and when a new service request transmitted by a target service producer instance as a service consumer after the service request is processed is received, transmit the new service request to a first-in-order service producer instance in a subsequent access order, the target service producer instance being one of the service producer instances corresponding to the plurality of service producer types.

In an embodiment, the new service request transmitted by the target service producer instance as the service consumer after the service request is processed includes: information about a service producer instance following the target service producer instance in the access order and the subsequent access order; and the new service request forwarded to the first-in-order service producer instance in the subsequent access order includes: information about a service producer instance following the first-in-order service producer instance in the subsequent access order and the subsequent access order.

In an embodiment, the control module 1040 is configured to:

transmit the service request and the access order to the first-in-order service producer instance in the access order, any service producer instance in the access order transmitting, after processing the service request, a new service request as a service consumer to a next service producer instance for processing, and sequentially return service response messages until all service producer instances in the access order have been processed.

In an embodiment, the obtaining module 1020 includes:

a transmission unit, configured to transmit a service discovery request to a specified device according to the plurality of service producer types;

a receiving unit, configured to receive service producer instance lists returned by the specified device according to the service discovery request; and a selection unit, configured to select the service producer instances corresponding to the plurality of service producer types from the service producer instance lists.

In an embodiment, the obtaining module 1020 is configured to:

detect whether a service producer instance that corresponds to the plurality of service producer types and meets parameter information in the service request is stored in a historical service discovery result;

obtain, the service producer instance that corresponds to the plurality of service producer types and meets the parameter information in the service request from the historical service discovery result when the service producer instance is stored; and transmit, when the service producer instance is not stored, a service discovery request to the specified device according to the plurality of service producer types and the parameter information included in the service request.

In an embodiment, a valid time is set for the historical service discovery result, and when the service producer instance that corresponds to the plurality of service producer types and meets the parameter information in the service request is stored in the historical service discovery result, the obtaining module 1020 is configured to:

determine whether the historical service discovery result exceeds the valid time;

transmit, when the historical service discovery result exceeds the valid time, a service discovery request to the specified device according to the plurality of service producer types and the parameter information included in the service request; and obtain, when the historical service discovery result does not exceed the valid time, the service producer instance that corresponds to the plurality of service producer types and meets the parameter information in the service request from the historical service discovery result. In an embodiment, the determining module 1030 is configured to:

determine an arrangement order of the plurality of service producer types according to order indication information in the service request; and use the arrangement order of the plurality of service producer types as the access order of the service producer instances corresponding to the plurality of service producer types.

According to an embodiment of the disclosure, a service request processing apparatus is further provided. The apparatus includes:

a receiving module, configured to receive a service request, the service request including information about to-be-accessed service producer instances and an access order of the to-be-accessed service producer instances;

a response module, configured to respond to the service request; and a transmission module, configured to: transmit, after the service request is responded to, a new service request as a service consumer to a service proxy device, so that the service proxy device transmits the new service request to a next service producer instance according to the access order; or transmit, after the service request is responded to, a new service request as a service consumer to a next service producer instance in the access order, so that the next service producer processes the new service request.

Figure 11:
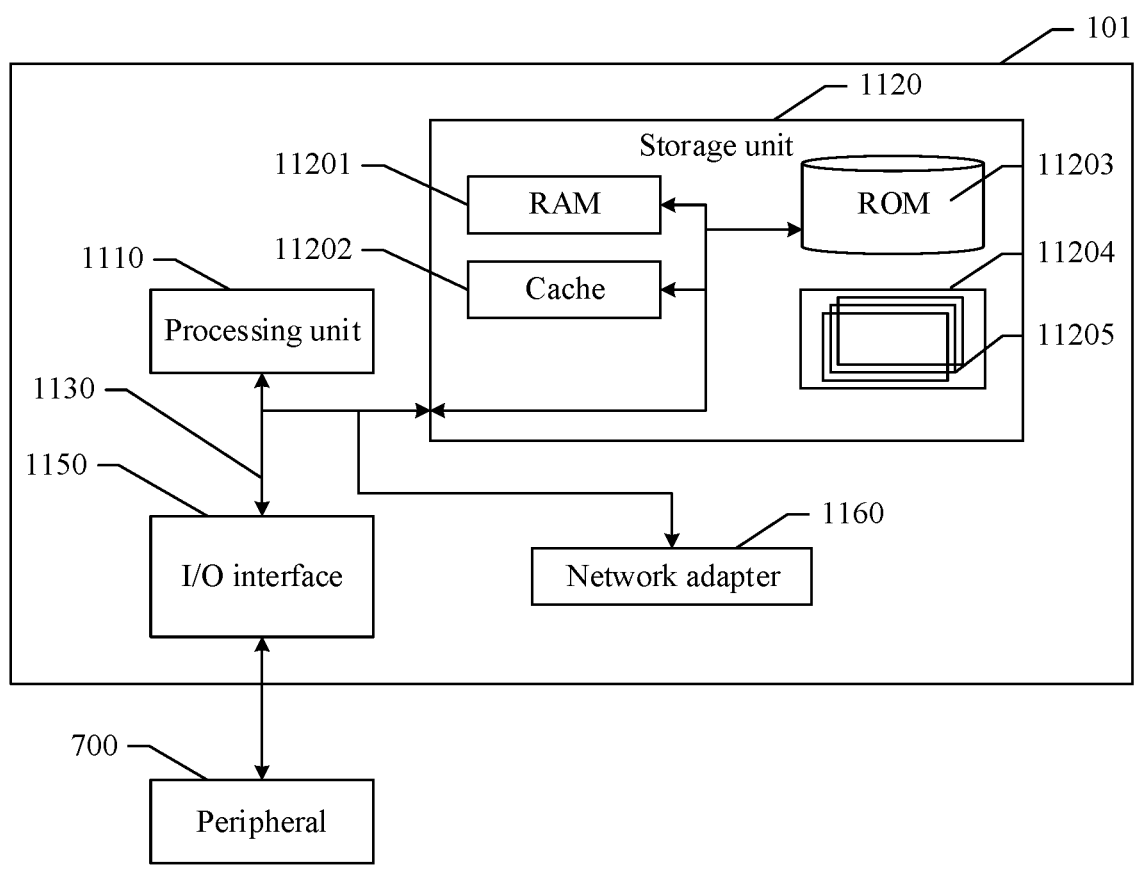
FIG. 11 is a schematic structural diagram of a computer system of an electronic device according to an example embodiment of the disclosure.

FIG. 11 is a schematic structural diagram of a computer system of an electronic device according to an example embodiment of the disclosure. A server 101 according to this embodiment of the disclosure is described below with reference to FIG. 11. The server 101 shown in FIG. 11 is only an example, and does not impose any limitation on functions and scopes of use of the embodiments of the disclosure.

As shown in FIG. 11, the server 101 is represented in a form of a computing device. Components of the server 101 may include, but are not limited to, at least one processing unit 1110, at least one storage unit 1120, and a bus 1130 connected to different system components (including the storage unit 1120 and the processing unit 1110). The storage unit stores program code. The program code, when executed by the processing unit 1110, may cause the processing unit 1110 to perform the operations according to the exemplary implementations of the disclosure described in the exemplary methods in this specification. For example, the processing unit 1110 may perform each operation shown in FIG. 2.

The storage unit 1120 may include a readable medium in the form of a volatile storage unit, for example, a random access memory (RAM) unit 11201 and/or a cache storage unit 11202, and may further include a read-only memory (ROM) unit 11203.

The storage unit 1120 may further include a program/utility tool 11204 having a group of (at least one) program modules 11205. Such a program module 11205 includes, but is not limited to, an operating system, one or more application programs, other program modules, and program data. Each or a combination of these examples may include implementation of a network environment.

The bus 1130 may represent one or more of several types of bus structures, including a storage unit bus or storage unit controller, a peripheral bus, an accelerated graphics port, a processing unit, or a local bus using any one of a plurality of bus structures.

The service proxy device 102 may also communicate with one or more peripherals 700 (for example, a keyboard, a pointing device, a Bluetooth device, and the like), and may also communicate with one or more devices that enable a user to interact with the service proxy device 102, and/or communicate with any device (for example, a router, a modem, and the like) that enables the service proxy device 102 to communicate with one or more other computing devices. This communication may proceed through an input/output (I/O) interface 1150. In addition, the service proxy device 102 may further communicate with one or more networks (for example, a local area network (LAN), a wide area network (WAN), and/or a public network such as the Internet) through a network adapter 1160. As shown in FIG, the network adapter 1160 communicates with other modules in the service proxy device 102 by using the bus 1130. It is to be understood that although not shown in the figure, other hardware and/or software modules may be used in conjunction with the service proxy device 102, including, but not limited to, microcode, a device driver, a redundancy processing unit, an external magnetic disk driving array, a redundant array of independent disks (RAID) system, a magnetic tape drive, a data backup storage system, and the like.

Through descriptions of the foregoing implementations, it is easy for a person skilled in the art to understand that the exemplary implementations described herein may be implemented by software or by combining software with related hardware. Therefore, the technical solutions of the implementations of the disclosure may be implemented in a form of a software product. The software product may be stored in a non-volatile storage medium (which may be a compact disc read-only memory (CD-ROM), a USB flash drive, a removable hard disk, or the like) or in a network and includes several instructions for instructing a computing device (which may be a personal computer, a server, a terminal device, a network device, or the like) to perform the methods described in the implementations of the disclosure.

In addition, an embodiment of the disclosure further provides a storage medium, the storage medium being configured to store a computer program, the computer program being configured to perform the method provided in the foregoing embodiments.

An embodiment of the disclosure further provides a computer program product including instructions, the computer program product, when run on a computer, causing the computer to perform the method according to the foregoing embodiments.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The computer-readable signal medium may include a data signal propagated in a baseband or as part of a carrier, and stores readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code used for executing the operations of the disclosure may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

Although several modules or units of a device for action execution are mentioned in the foregoing detailed descriptions, the division is not mandatory. Actually, according to the implementations of the disclosure, the features and functions of two or more modules or units described above may be specified in one module or unit. Conversely, features and functions of one module or unit described above may be further divided into a plurality of modules or units to be specified.

In addition, although the various operations of the method in the disclosure are described in a specific order in the accompanying drawings, this does not require or imply that the steps are bound to be performed in the specific order, or all the steps shown are bound to be performed to achieve the desired result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein may be implemented by software or by combining software with related hardware. Therefore, the technical solutions of the implementations of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a mobile terminal, a network device, or the like) to perform the methods according to the implementations of the disclosure.

The technical solutions provided in the embodiments of the disclosure may include the following beneficial effects.

Service producer instances corresponding to a plurality of service producer types included in a service request transmitted by a service consumer are obtained at the same time; an access order of the service producer instances corresponding to the plurality of service producer types is determined; and the service producer instances corresponding to the plurality of service producer types are controlled to process the service request according to the access order, to enhance a service discovery mechanism, thereby reducing a quantity of times of requesting service discovery, and improving the service request processing efficiency.

Other embodiments of the disclosure are apparent to a person skilled in the art from consideration of the specification and practice of the disclosure here. The disclosure is intended to cover any variations, uses or adaptive changes of the disclosure. Such variations, uses or adaptive changes follow the general principles of the disclosure, and include well-known knowledge and conventional technical means in the art that are not disclosed in the disclosure. The specification and the embodiments are merely considered as examples, and the actual scope and the spirit of the disclosure are pointed out by the following claims.

What is claimed is:

1. A service request processing method, performed by a service proxy device, the method comprising:
   receiving a service request from a service consumer, the service request comprising a plurality of service producer types;
   obtaining service producer instances respectively corresponding to the plurality of service producer types;

determining an access order of the service producer instances; and controlling the service producer instances to process the service request based on the access order, wherein the service request received from the service consumer comprises order indication information indicating an arrangement order of the plurality of service producer types, and the plurality of service producer types included in the order indication information comprise different service types of a session management function (SMF) or a policy control function (PCF), wherein the determining the access order of the service producer instances comprises determining, based on the arrangement order of the plurality of service producer types, the access order of the service producer instances, wherein the arrangement order indicates an order in which a service request is to be sequentially transmitted to the different service types of the SMF or the PCF, and the service request is sequentially transmitted to a next-in-order service producer instance in the arrangement order based on processing of the service request by a current service producer instance being completed, and wherein the controlling the service producer instances comprises receiving, from the current service producer instance after the current service producer instance processes the service request, a new service request including information about the next-in-order service producer instance, which is next in order in the determined access order based on the arrangement order, and transmitting the new service request to the next-in-order service producer instance.

2. The method according to claim 1, wherein
the new service request transmitted to the next-in-order service producer instance comprises: information about a service producer instance, which has a subsequent access order following the next-in-order service producer instance in the access order.

3. The method according to claim 1, wherein the controlling the service producer instances comprises:
transmitting the service request and the access order to a first-in-order service producer instance in the access order, upon which all service producer instances in the access order process corresponding service requests.

4. The method according to claim 1, wherein the obtaining the service producer instances comprises:
transmitting a service discovery request to a specified device according to the plurality of service producer types;
receiving service producer instance lists from the specified device according to the service discovery request; and
selecting the service producer instances corresponding to the plurality of service producer types from the service producer instance lists.

5. The method according to claim 4, further comprising:
detecting whether a service producer instance that corresponds to the plurality of service producer types and meets parameter information in the service request is stored in a historical service discovery result;
obtaining the service producer instance that corresponds to the plurality of service producer types and meets the parameter information in the service request from the historical service discovery result, based on the service producer instance being stored in the historical service discovery result; and based on the service producer instance not being stored, transmitting the service discovery request to the specified device.

6. The method according to claim 5, wherein a valid time is set for the historical service discovery result, and the method further comprises, based on the service producer instance that corresponds to the plurality of service producer types and meets the parameter information in the service request being stored in the historical service discovery result:
determining whether the historical service discovery result exceeds the valid time; and
based on the historical service discovery result exceeding the valid time, transmitting the service discovery request to the specified device.

7. A non-transitory computer-readable storage medium, configured to store a computer program, the computer program being executable by at least one processor to perform the method according to claim 1.

8. The method according to claim 1, wherein the service request includes service types of a V-SMF and an H-SMF and order indication information indicating an arrangement order of the V-SMF and the H-SMF.

9. The method according to claim 1, wherein the service request includes service types of a V-PCF and an H-PCF and order indication information indicating an arrangement order of the V-PCF and the H-PCF.

10. A service request processing apparatus, comprising:
at least one memory configured to store program code; and
at least one processor configured to read the program code and operate as instructed by the program code, the program code comprising:
receiving code configured to cause the at least one processor to receive a service request transmitted by a service consumer, the service request comprising a plurality of service producer types;
first obtaining code configured to cause the at least one processor to obtain service producer instances respectively corresponding to the plurality of service producer types according to the service request;
determining code configured to cause the at least one processor to determine an access order of the service producer instances corresponding to the plurality of service producer types; and
control code configured to cause the at least one processor to control the service producer instances corresponding to the plurality of service producer types to process the service request according to the access order,
wherein the service request received from the service consumer comprises order indication information indicating an arrangement order of the plurality of service producer types, and the plurality of service producer types included in the order indication information comprise different service types of a session management function (SMF) or a policy control function (PCF),
wherein the determining code is configured to cause the at least one processor to determine, based on the arrangement order of the plurality of service producer types, the access order of the service producer instances,
wherein the arrangement order indicates an order in which a service request is to be sequentially transmitted to the different service types of the SMF or the PCF, and the service request is sequentially transmitted to a next-in-order service producer instance in the arrangement order based on processing of the service request by a current service producer instance being completed, and wherein the control code configured to cause the at least one processor to receive, from the current service producer instance after the current service producer instance processes the service request, a new service request including information about the next-in-order service producer instance, which is next in order in the determined access order based on the arrangement order; and transmit the new service request to the next-in-order service producer instance.

11. A service request processing apparatus, comprising:
at least one memory configured to store program code; and
at least one processor configured to read the program code and operate as instructed by the program code, the program code comprising:
receiving code configured to cause the at least one processor to receive a service request, the service request comprising information about to-be-accessed service producer instances and an access order of the to-be-accessed service producer instances;
response code configured to cause the at least one processor to respond to the service request; and
transmission code configured to cause the at least one processor to: transmit, after the service request is responded to, a new service request as a service consumer to a service proxy device, so that the service proxy device transmits the new service request to a next service producer instance according to the access order; or transmit, after the service request is responded to, a new service request as a service consumer to a next service producer instance in the access order, so that the next service producer instance processes the new service request,
wherein the access order of the to-be-accessed service producer instances comprises an access order between different service types of a session management function (SMF) or a policy control function (PCF), and
wherein the arrangement order indicates an order in which a service request is to be sequentially transmitted to the different service types of the SMF or the PCF, and the service request is sequentially transmitted to a next-in-order service producer instance in the arrangement order based on processing of the service request by a current service producer instance being completed, and
wherein the new service request includes information about the next-in-order service producer instance, which is next in order in the determined access order based on the arrangement order.

12. The apparatus according to claim 11, wherein
the new service request transmitted to the next-in-order service producer instance comprises: information about a service producer instance, which has a subsequent access order following the next-in-order service producer instance in the access order.

13. The apparatus according to claim 10, wherein the control code is configured to cause the at least one processor to transmit the service request and the access order to a first-in-order service producer instance in the access order, upon which all service producer instances in the access order process corresponding service requests.

14. The apparatus according to claim 10, wherein the first obtaining code is configured to cause the at least one processor to transmit a service discovery request to a specified device according to the plurality of service producer types; receive service producer instance lists from the specified device according to the service discovery request; and select the service producer instances corresponding to the plurality of service producer types from the service producer instance lists.

15. The apparatus according to claim 14, wherein the program code further comprises:
detecting code configured to cause the at least one processor to detect whether a service producer instance that corresponds to the plurality of service producer types and meets parameter information in the service request is stored in a historical service discovery result;
second obtaining code configured to cause the at least one processor to obtain the service producer instance that corresponds to the plurality of service producer types and meets the parameter information in the service request from the historical service discovery result, based on the service producer instance being stored in the historical service discovery result; and
transmitting code configured to cause the at least one processor to, based on the service producer instance not being stored, transmit the service discovery request to the specified device.

16. The apparatus according to claim 15, wherein a valid time is set for the historical service discovery result, and the program code further comprises:
validity determining code configured to cause the at least one processor to, based on the service producer instance that corresponds to the plurality of service producer types and meets the parameter information in the service request being stored in the historical service discovery result, determine whether the historical service discovery result exceeds the valid time, and
wherein the transmitting code is configured to cause the at least one processor to, based on the historical service discovery result exceeding the valid time, transmit the service discovery request to the specified device.

* * * * *